United States Patent
Morimoto et al.

(10) Patent No.: US 10,165,098 B2
(45) Date of Patent: Dec. 25, 2018

(54) TELEPHONE SWITCHING APPARATUS AND METHOD, AND PROGRAM

(71) Applicants: NEC Platforms, Ltd., Kawasaki-shi, Kanagawa (JP); NIPPON TELEGRAPH AND TELEPHONE EAST CORPORATION, Tokyo (JP); NIPPON TELEGRAPH AND TELEPHONE WEST CORPORATION, Osaka-shi, Osaka (JP)

(72) Inventors: Toru Morimoto, Kawasaki (JP); Hiromi Sasaki, Tokyo (JP); Makoto Kobayashi, Osaka (JP)

(73) Assignees: NEC Platforms, Ltd., Kawasaki-shi, Kanagawa (JP); NIPPON TELEGRAPH AND TELEPHONE EAST CORPORATION, Shinjuku-ku, Tokyo (JP); NIPPON TELEGRAPH AND TELEPHONE WEST CORPORATION, Osaka-shi, Osaka (JP)

( * ) Notice: Subject to any disclaimer, the term of this patent is extended or adjusted under 35 U.S.C. 154(b) by 0 days.

(21) Appl. No.: 15/577,598

(22) PCT Filed: Sep. 6, 2016

(86) PCT No.: PCT/JP2016/076101
§ 371 (c)(1),
(2) Date: Nov. 28, 2017

(87) PCT Pub. No.: WO2017/043465
PCT Pub. Date: Mar. 16, 2017

(65) Prior Publication Data
US 2018/0131795 A1    May 10, 2018

(30) Foreign Application Priority Data

Sep. 10, 2015 (JP) ................................. 2015-178196

(51) Int. Cl.
*H04M 1/247* (2006.01)
*H04M 3/42* (2006.01)
(Continued)

(52) U.S. Cl.
CPC ........... *H04M 1/2477* (2013.01); *H04M 3/42* (2013.01); *H04M 3/42221* (2013.01);
(Continued)

(58) Field of Classification Search
CPC .... H04M 3/51; H04M 3/523; H04M 3/42221; H04M 3/493; H04M 3/5175;
(Continued)

(56) References Cited

U.S. PATENT DOCUMENTS 5,249,217 A * 9/1993 Lee ..................... H04M 1/656
379/67.1
5,535,262 A 7/1996 Kanzawa
(Continued)

FOREIGN PATENT DOCUMENTS

CN       1122081 A    5/1996
CN     203340170 U   12/2013
(Continued)

OTHER PUBLICATIONS

Communication dated Jan. 15, 2018 from the Intellectual Property Office of Australia in counterpart application No. 2016319432.
(Continued)

*Primary Examiner* — Akelaw Teshale
(74) *Attorney, Agent, or Firm* — Sughrue Mion, PLLC

(57) ABSTRACT

In a telephone switching apparatus equipped with an automatic call recording function, when recording of a call is
(Continued)

started, a PB signal cannot be sent by operating a button any longer. Further, a user mistakenly assumes that there is a problem because the PB signal cannot be sent. Means capable of selecting, when recording means starts recording of a call, whether a PB signal is sent or not is provided, thus making it possible to send a PB signal.

6 Claims, 5 Drawing Sheets

(51) Int. Cl.
 *H04M 11/10* (2006.01)
 *H04M 9/00* (2006.01)
 *H04Q 1/45* (2006.01)
 *H04M 3/493* (2006.01)

(52) U.S. Cl.
 CPC ............. *H04M 9/00* (2013.01); *H04M 11/10* (2013.01); *H04Q 1/45* (2013.01); *H04M 3/493* (2013.01); *H04M 2203/1016* (2013.01); *H04M 2203/30* (2013.01)

(58) Field of Classification Search
 CPC ...... H04M 3/436; H04M 3/5166; H04M 3/36; H04M 3/5232; H04M 3/5335; H04M 1/575; H04M 1/663
 USPC ... 379/88.18, 88.22, 265.01, 265.06, 142.17, 379/265.12, 67.1, 88.01, 207.15, 265.07, 379/266.01, 85, 88.11, 88.25, 88.26, 133, 379/265.02, 266.1, 71
 See application file for complete search history.

(56) References Cited

U.S. PATENT DOCUMENTS

| | | | | |
|---|---|---|---|---|
| 6,355,927 B1* | 3/2002 | Snyder | ............... | G01D 5/24404 250/214 R |
| RE39,722 E* | 7/2007 | Hansen, II | ............ | H04M 3/533 379/88.07 |
| 8,477,915 B1* | 7/2013 | Vasquez | ............ | H04M 3/42221 370/260 |
| 8,644,457 B1* | 2/2014 | Vasquez | .............. | H04M 3/4217 379/266.1 |
| 2002/0067810 A1 | 6/2002 | Barak et al. | | |
| 2003/0048879 A1 | 3/2003 | Wrona et al. | | |
| 2005/0070250 A1* | 3/2005 | Scalisi | .............. | H04M 3/42195 455/411 |
| 2007/0206569 A1 | 9/2007 | Silver et al. | | |
| 2007/0206729 A1* | 9/2007 | Baum | .................... | H04M 11/04 379/37 |
| 2009/0217180 A1* | 8/2009 | Tovino | ................. | H04M 1/2472 715/762 |
| 2010/0034362 A1* | 2/2010 | Phelps | .............. | H04M 3/42221 379/88.19 |
| 2010/0310056 A1* | 12/2010 | Perlmutter | ........ | H04M 3/42221 379/85 |
| 2013/0114801 A1* | 5/2013 | Perlmutter | ........ | H04M 3/42221 379/88.04 |
| 2013/0136242 A1* | 5/2013 | Ross | ....................... | H04M 3/51 379/85 |
| 2015/0256988 A1* | 9/2015 | Wen | ...................... | H04L 51/046 370/329 |

FOREIGN PATENT DOCUMENTS

| | | |
|---|---|---|
| CN | 104869106 A | 8/2015 |
| JP | 63-256046 A | 10/1988 |
| JP | 4-107044 A | 4/1992 |
| JP | 8-289021 A | 11/1996 |
| JP | 11-098270 A | 4/1999 |
| JP | 11-355821 A | 12/1999 |
| JP | 2002-135419 A | 5/2002 |
| WO | 01/017207 A1 | 3/2001 |

OTHER PUBLICATIONS

JPO Office Action for Application No. 2015-178196 dated Sep. 20, 2016.
JPO Notice of Allowance for Application No. 2015-178196 dated Apr. 18, 2017.
International Search Report for PCT/JP2016/076101 dated Nov. 29, 2016 [PCT/ISA/210].
Communication dated Jun. 4, 2018, from the European Patent Office in counterpart European Application No. 16844326.5.
Communication dated Aug. 1, 2018 from the State Intellectual Property Office of the People's Republic of China in Application No. 201680031458.0.

* cited by examiner

<LCD SCREEN EXAMPLE>

IS PB SIGNAL SENT?
    NO
 ⇒ YES

Fig. 3

<LCD SCREEN EXAMPLE>

OPERATION WHEN DIAL IS OPERATED
　　VM CONTROL
　⇒PB SIGNAL SENDING

Fig. 5A

<LCD SCREEN EXAMPLE>

OPERATION WHEN DIAL IS OPERATED
　⇒VM CONTROL
　　PB SIGNAL SENDING

Fig. 5B

TELEPHONE SWITCHING APPARATUS AND METHOD, AND PROGRAM

CROSS REFERENCE TO RELATED APPLICATIONS

This application is a National Stage of International Application No. PCT/JP2016/076101, filed on Sep. 6, 2016, which claims priority from Japanese Patent Application No. 2015-178196, filed on Sep. 10, 2015, the contents of all of which are incorporated herein by reference in their entirety.

TECHNICAL FIELD

The present disclosure relates to a telephone switching apparatus and a method, and a program.

BACKGROUND ART

A telephone switching apparatus such as a key telephone apparatus and a private branch exchange (PBX (Private Branch Exchange)) is equipped with an automatic call recording function.

This call recording function is provided to record, for example, an unsolicited telephone call such as a nuisance telephone call, a threatening telephone call and a fraud telephone call, and a call log. A main apparatus of a key telephone apparatus accommodating an extension telephone is equipped with a unit for accumulating voices. Therefore, every time a call is made, the main apparatus of the key telephone apparatus can record the call.

Examples of the automatic call recording function of the telephone switching apparatus include a technique disclosed in Patent Literature 1.

CITATION LIST

Patent Literature

Patent Literature 1: Japanese Unexamined Patent Application Publication No. H4-107044

SUMMARY OF INVENTION

Technical Problem

In such an automatic call recording function of a key telephone apparatus, when recording of a call is started, a button operation performed in an extension telephone is changed to an operation for call recording. That is, when call recording is started, its function changes to a function of receiving a button operation for an instruction as to whether the call recording should be finished or not, an instruction as to whether the recorded call should be deleted or not, an instruction as to whether the recorded call should be played back or not, or the like.

Meanwhile, when an automatic voice response apparatus is provided in a call destination, it is necessary to send a push button signal (hereinafter called a PB (Push Button) signal or a DTMF (Dual Tone Multi-Frequency) signal) by operating buttons of the extension telephone according to audio guidance or the like provided from the automatic voice response apparatus. However, when the automatic call recording function is started, the dial button operation is changed to the recording function operation. Therefore, when the other end of an outside-line call is audio guidance, it is impossible to send a PB signal even when a dial button operation is performed in the extension telephone. Further, in the case of automatic call recording, a user is not usually aware that the call is being recorded. Therefore, when a user makes a call to audio guidance, the user sometimes mistakenly assumes that a malfunction occurs because a PB signal cannot be sent.

The present disclosure has been made to solve the above-described problem. That is, the present disclosure has been made to enable, when an outside-line call is made and automatic call recording is started, a user to select whether a PB signal is sent or not and thereby to prevent, in a telephone switching apparatus having an automatic recording function, an occurrence of a problem in which the user mistakenly assumes that the PB signal cannot be sent, and a malfunction occurs because the PB signal cannot be sent.

Solution to Problem

A first aspect of the present disclosure is a telephone switching apparatus. That is, the first aspect of the present disclosure is a telephone switching apparatus accommodating at least one extension telephone and configured to enable the extension telephone to communicate with an outside-line network through an outside-line interface, in which the telephone switching apparatus includes recording means for automatically recording a call between the extension telephone and the outside-line network, and the telephone switching apparatus includes switching means for switching, when the recording means starts recording, to a state where a PB signal can be sent in response to an operation performed at a specific button of the extension telephone.

Further, a second aspect of the present disclosure is a communication method for a telephone switching apparatus. That is, the second aspect of the present disclosure is a communication method for a telephone switching apparatus accommodating at least one extension telephone and configured to enable the extension telephone to communicate with an outside-line network through an outside-line interface, in which the telephone switching apparatus is configured to automatically record a call between the extension telephone and the outside-line network, and the communication method includes switching, when recording of a call is started, to a state where a PB signal can be sent in response to an operation performed at a specific button of the extension telephone.

Note that by installing in an information processing apparatus, the function of each means of the above-described telephone switching apparatus can be implemented.

Advantageous Effects of Invention

A situation in which when an outside-line call is made from an extension telephone and the other end of the communication is audio guidance, a PB signal for responding to the audio guidance cannot be sent does not occur any longer. Further, users do not mistakenly recognize the problem any longer.

BRIEF DESCRIPTION OF DRAWINGS

FIG. 3 shows an example of a screen displayed on an LCD of an extension telephone according to the first embodiment;

FIG. 5A and FIG. 5B show an example of a screen displayed on an LCD of an extension telephone according to the second embodiment.

DESCRIPTION OF EMBODIMENTS

Embodiments according to the present disclosure are explained hereinafter with reference to the drawings.

Figure 1:
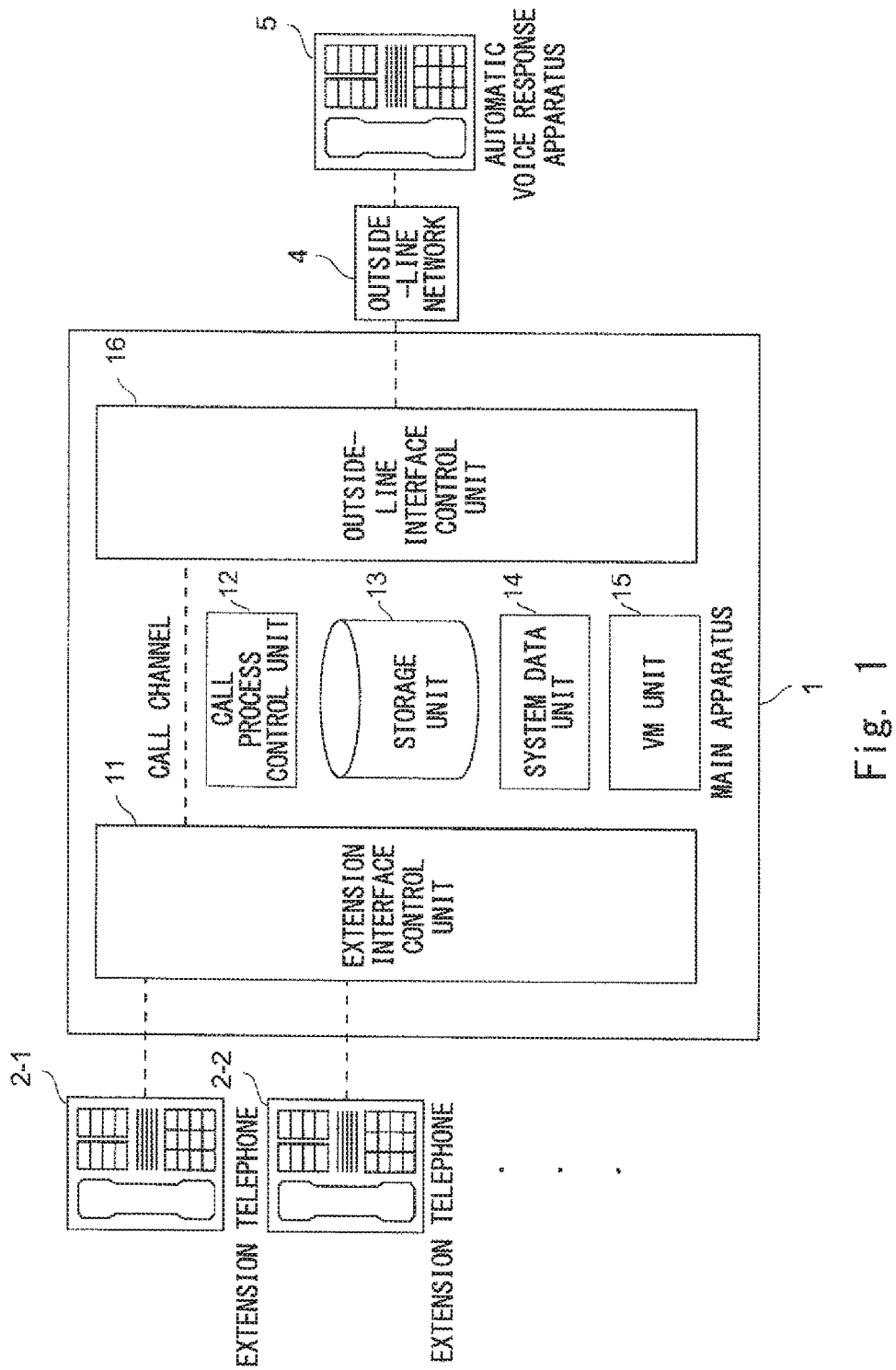
FIG. 1 shows a configuration of a key telephone apparatus according to the present disclosure.

FIG. 1 shows a configuration of a key telephone apparatus as a telephone switching apparatus according to an embodiment of the present disclosure. Note that in this specification the telephone switching apparatus is explained as a key telephone apparatus. However, a feature that at least one extension telephone is accommodated and telephone switching is performed also applies to a private branch exchange (PBX).

In a key telephone apparatus according to this embodiment, a plurality of extension telephones 2-1 and 2-2 are connected to a main apparatus 1 and connected to an outside-line network 4. The main apparatus 1 includes an extension interface control unit 11, a call process control unit 12, a storage unit 13, a system data unit 14, a VM (Voice Mail) unit 15, and an outside-line interface control unit 16.

The extension telephones 2-1 and 2-2 are accommodated in the main apparatus 1 through the extension interface control unit 11. Further, they are connected to the outside-line network 4 through the outside-line interface control unit 16. The call process control unit 12 controls extension/outside-line outgoing and incoming calls performed inside the main apparatus 1. The storage unit 13 stores recorded calls. The system data unit 14 manages various settings of the main apparatus 1. For example, the system data unit 14 manages a setting for "availability/unavailability of a dial operation at the time of outgoing outside-line automatic call recording" according to this embodiment. The VM unit 15 controls recording of calls. The VM unit 15 is a message recording/call recording and playback unit. The system data unit 14 and the VM unit 15 are in charge of the function for switching, when the recording means starts recording, to a state where a PB signal can be sent in response to an operation performed at a specific button of the extension telephone as specified in the claims.

Note that the configuration of each part of the above-described main apparatus 1 is described in view of its function. Further, needless to say, the function of each part of the above-described the extension interface control unit 11, the call process control unit 12, the storage unit 13, the system data unit 14, the VM unit 15, and the outside-line interface control unit 16 can be implemented by using an information processing apparatus including a CPU (Central Processing Unit), a memory, and a communication circuit as the main apparatus 1 and installing a control program in the memory of the main apparatus 1.

An automatic voice response apparatus 5 is connected to the outside-line network 4 as audio guidance. Further, it has functions of sending audio guidance after receiving a call from the main apparatus 1, receiving a PB signal generated by a dial operation performed in an extension telephone 2 (hereinafter the extension telephones 2-1, 2-2 . . . are collectively referred to as the extension telephone 2) on the call-sending side, and passing on the call to an appropriate section in charge by forwarding an extension call or an incoming call.

Figure 2:
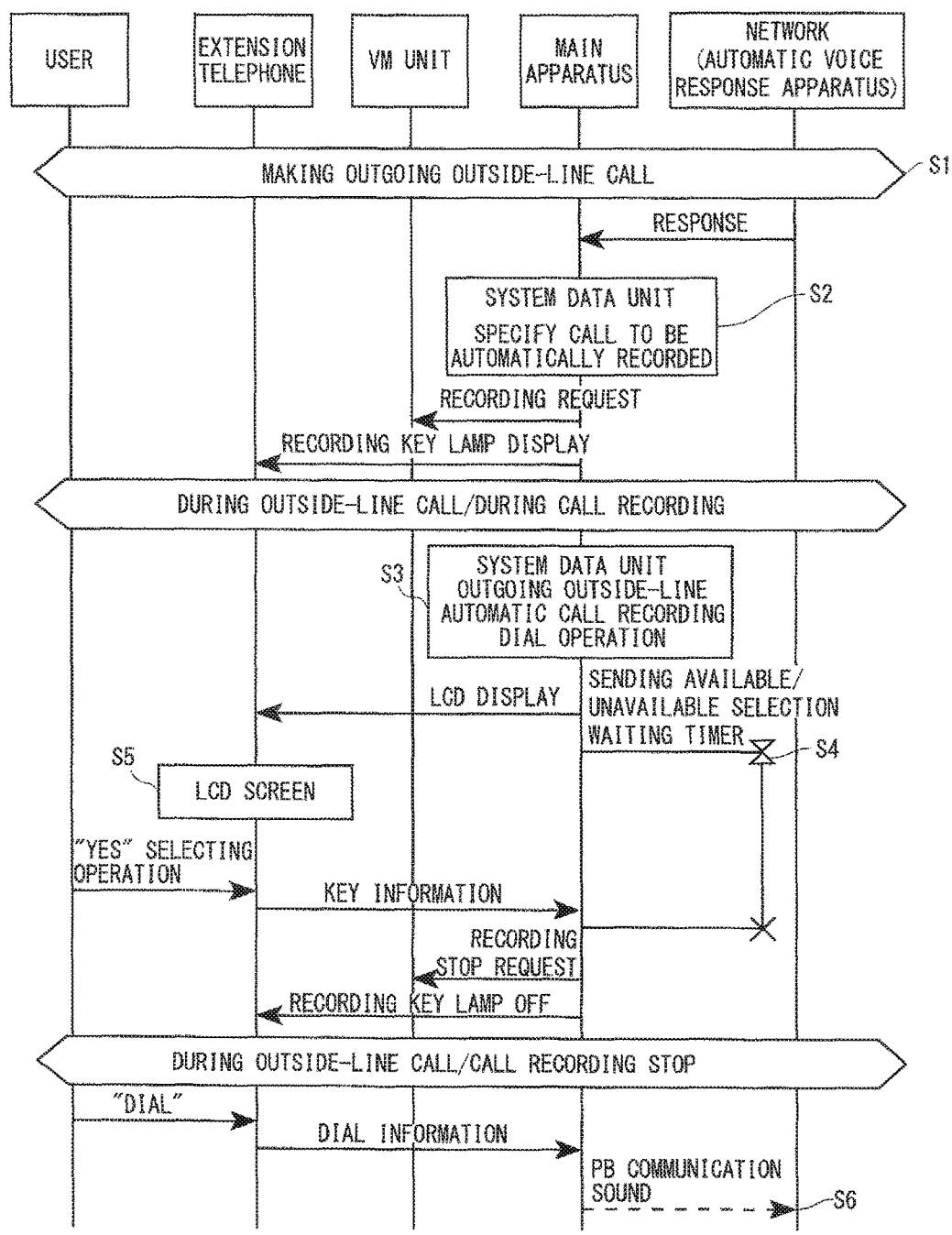
FIG. 2 shows a sequence according to a first embodiment.

Next, an operation according to a first embodiment of the present disclosure is explained with reference to FIGS. 2 and 3. FIG. 2 shows a sequence of an operation according to the first embodiment of the present disclosure and FIG. 3 shows an example of a display displayed in a screen of an LCD (Liquid Crystal Display) display device of the extension telephone 2.

A user makes an outside-line call from the extension telephone 2, which is set to automatically record a call, to the outside-line network 4 through the main apparatus 1 (step S1).

The outside-line network 4 side sends back a response to the main apparatus 1 by using the automatic voice response apparatus 5 having an IVR (Interactive Voice Response) function or the like. In the main apparatus 1, a recording request is sent to the VM unit 15 under the control of the system data unit 14 at the timing of the response and the VM unit 15 starts recording of the call (step S2).

Since the call to be recorded is "an outgoing outside-line call and a call to be automatically recorded", the main apparatus 1 displays a screen for availability/unavailability of PB signal sending in the LCD display device of the extension telephone 2 under the control of the system data unit 14 (step S3). As shown in FIG. 3, this display indicates text "Is a PB signal sent?", choices of "No" and "Yes", a button that is pressed as "No" or "Yes", and a decision button. For example, a volume selecting button and a decision button are used, such as "move by volume '▲' (large) or volume '▼' (small), and select by pressing 'decision'". Alternatively, it may be an operation in which a specific button, e.g., a "*" button is pressed. Any kind of button may be used for the selection and decision for this display.

At the same time as the display of the selecting screen for the availability/unavailability of PB signal sending in the LCD display device of the extension telephone 2, the main apparatus 1 starts a display timer of the LCD display device and thereby starts measuring a time under the control of the system data unit 14. When the user has not performed a decision operation in the extension telephone 2 before the end of the timer, the display in the LCD is finished and the call recording control is continued. Therefore, no PB signal can be sent until the call is finished (step S4).

The user listens to the response audio guidance sent from the automatic voice response apparatus 8 on the outside-line network side, determines the need for PB signal sending, operates the extension telephone 2, and performs a decision operation about the PB signal sending. When the user performs a selecting operation of "Yes", the main apparatus 1 receives key information from the extension telephone 2 and provides a request to stop the call recording to the VM unit 15. The VM unit 15 stops the call recording (step S5).

As the call recording is stopped, dial information entered by the user makes it possible to send a PB signal from the main apparatus 1 to the automatic voice response apparatus 5 on the outside-line network 4 side without transmitting it through the VM unit 15. In this way, the user can respond to the audio guidance sent from the automatic voice response apparatus 5 such as the IVR.

Figure 4:
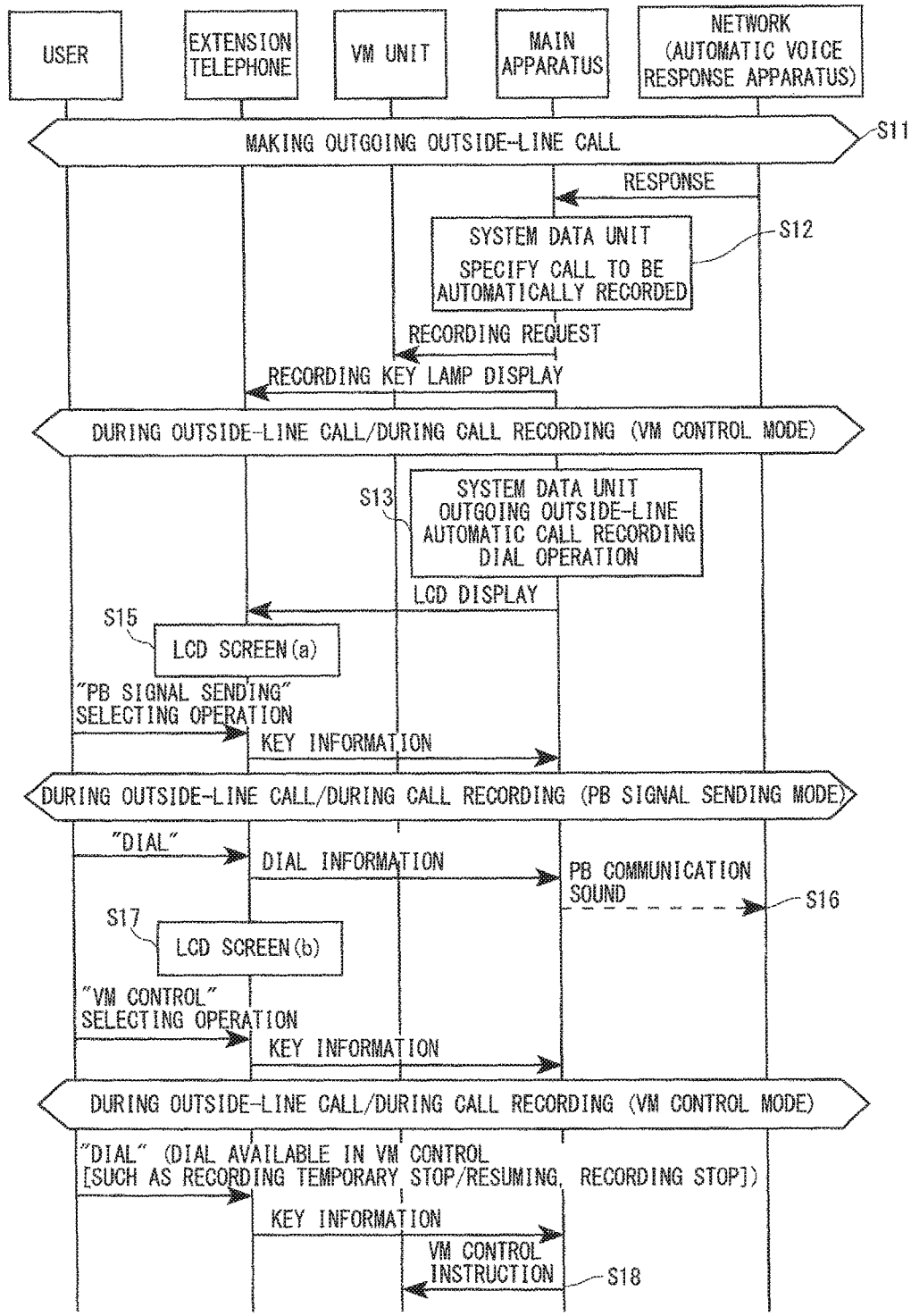
FIG. 4 shows a sequence according to a second embodiment.

Next, an operation according to a second embodiment is explained with reference to FIGS. 4, 5A and 5B. FIG. 4 shows a sequence according to the second embodiment and FIG. 5A and FIG. 5B show an example of a display displayed in an LCD display device of an extension telephone.

A user makes an outside-line call from the extension telephone 2, which is set to automatically record a call, to the outside-line network 4 through the main apparatus 1 (step S11). The outside-line network 4 side sends back a response to the main apparatus 1 by using the automatic voice response apparatus 5 having an IVR function. In the main apparatus 1, a recording request is sent to the VM unit 15 under the control of the system data unit 14 at the timing of the response and the VM unit 15 starts recording of the call (step S12). Since the call to be recorded is "an outgoing outside-line call and a call to be automatically recorded", the main apparatus 1 displays a screen for availability/unavailability of PB signal sending in the LCD display device of the extension telephone 2 under the control of the system data unit 14 (step S13). So far, the operation is similar to the operation in the first embodiment.

In the second embodiment, a selecting screen as to "whether a PB signal is sent or VM control is continued" is displayed in the LCD display device (step S15). This display is continuously displayed until the call is finished.

The user listens to the response audio guidance or the like sent from the automatic voice response apparatus 8 on the outside-line network side, determines the need for PB signal sending, and selects whether a PB signal is sent or not. Regarding the selection, by the display in the LCD display device, it is selected whether a PB signal is sent or not by operating a corresponding button. In an example shown in FIG. 5A, an example of a display in which call recording (VM control) or PB signal sending is selected and "a PB signal is sent" is selected by pressing a decision button is shown.

When the PB signal sending is selected, the main apparatus 1 receives key information from the extension telephone 2 and sends a PB signal to the outside-line network 4 without transmitting it through the VM unit 15 (step S16).

By the selecting operation, dial information entered by the user makes it possible to send a PB signal from the main apparatus 1 to the automatic voice response apparatus 5 on the outside-line network 4 side without transmitting it through the VM unit 15. In this way, the user can respond to the audio guidance sent from the automatic voice response apparatus 5 such as an adaptive voice response apparatus.

When the user wants to perform an operation for a function for call recording such as temporarily stopping the recording, resuming the recording, or finishing the recording, the user performs a decision operation for selecting the VM control (the call recording) in the LCD screen which is continuously displayed (step S17). When the VM control is selected, the main apparatus 1 receives key information from the extension telephone 2 and changes the control so that dial information is sent to the VM unit 15. The dial information entered by the user is sent to the VM unit 15 and operations, such as temporarily stopping the recording, resuming the recording, and finishing the recording, become available (step S18). FIG. 5B shows an example of a display in the LCD display device of the extension telephone 2 indicating that the VM control has been selected.

Note that the display in the LCD is an example in which a selection is made by using a button indicating a shift and a decision button. Any kind of button may be used for the selection of the "PB signal sending" or the "VM control". Further, in the case where the operation in the extension telephone 2 is performed by using a touch-panel technique, an operation can be performed by touching an instruction mark displayed in the LCD.

Further, in the above explanation of the embodiments, the PB signal sending is made available by displaying a selection menu in the LCD screen and performing an operation according to its display. However, it is possible to send a PB signal without displaying a selection menu in the LCD screen. For example, a PB signal can be sent by pressing a specific button according to audio guidance. In an automatic voice response apparatus in a call center or the like in these days, in consideration of customers who make telephone calls without being aware that the dial signal type is set to the dial pulse, there are cases where a voice message such as "when the dial signal type is set to the dial pulse, please press a *-button to change the dial signal type to the PB signal before pressing dial buttons" is sent. Even in such a case, it is possible to switch the dial signal type to the PB signal by operating a button according to the voice message.

As described above, in the past, when an automatic call recording function is provided and a call destination requires a PB signal such as when a call destination is audio guidance, a call is temporarily finished and, after setting a key telephone apparatus to "automatic call recording setting: OFF", a call is made again. However, it is unnecessary to perform such processes any longer. Further, it is unnecessary to make a call again. That is, since it is possible to perform an operation for PB signal sending or the like in a series of calling states, a burden on a caller is reduced. Further, in the case of an outgoing call to an outside-line network that incurs billing, a burden in terms of cost is reduced.

REFERENCE SIGNS LIST

1 MAIN APPARATUS
2-1, 2-2 EXTENSION TELEPHONE
4 OUTSIDE-LINE NETWORK
5 AUTOMATIC VOICE RESPONSE APPARATUS
11 EXTENSION INTERFACE CONTROL UNIT
12 CALL PROCESS CONTROL UNIT
13 STORAGE UNIT
14 SYSTEM DATA UNIT
15 VM UNIT
16 OUTSIDE-LINE INTERFACE CONTROL UNIT

The invention claimed is:

1. A telephone switching apparatus accommodating at least one extension telephone and configured to enable the extension telephone to communicate with an outside-line network through an outside-line interface, wherein
the telephone switching apparatus comprises:
at least one memory storing instructions, and
at least one processor configured to execute the instructions to;
record a call between the extension telephone and the outside-line network,
when recording of the call is started, a button operation becomes a recording function operation state where a DTMF (Dual Tone Multi-Frequency) signal cannot be sent, and
wherein the at least one processor is further configured to execute the instructions to switch, when recording of the call is started, the button operation to a DTMF signal sending function operation state where a DTMF signal can be sent in response to an operation performed at a specific button of the extension telephone.

2. The telephone switching apparatus according to claim 1, wherein the at least one processor is further configured to execute the instructions to switch, when the extension telephone makes an outgoing outside-line call, to signal sending function operation state when a response from the outside-line network is a response from an automatic voice response apparatus.

3. The telephone switching apparatus according to claim 1, wherein the at least one processor is further configured to execute the instructions to stop call recording and sends a DTMF signal when a button for sending the DTMF signal is operated in the extension telephone.

4. The telephone switching apparatus according to claim 1, wherein the at least one processor is further configured to execute the instructions to stop call recording when a button for requesting to stop call recording is operated in the extension telephone.

5. A communication method for a telephone switching apparatus accommodating at least one extension telephone and configured to enable the extension telephone to communicate with an outside-line network through an outside-line interface, wherein
- a call between the extension telephone and the outside-line network is automatically recorded and when recording is started, a button operation becomes a recording function operation state where a DTMF (Dual Tone Multi-Frequency) signal cannot be sent, and
- the communication method comprises switching, when recording of a call is started, the button operation to a DTMF signal sending function operation state where a DTMF signal can be sent in response to an operation performed at a specific button of the extension telephone.

6. A non-transitory computer readable medium storing a program for causing a computer to perform a communication method, the method comprising:
- recording a call between the extension telephone and the outside-line network automatically, wherein a button operation becomes, when recording of the call is started, a recording function operation state where a DTMF (Dual Tone Multi-Frequency) signal cannot be sent; and
- switching, when recording of the call is started, the button operation to a DTMF signal sending function operation state where a DTMF signal can be sent in response to an operation performed at a specific button of the extension telephone.

* * * * *